United States Patent
McLendon

[15] 3,653,186
[45] Apr. 4, 1972

[54] WET SCRUBBER TANK

[72] Inventor: Hoyt B. McLendon, 2323 46th Street South, Petersburg, Fla. 33711

[22] Filed: Feb. 24, 1970

[21] Appl. No.: 13,560

[52] U.S. Cl. ............................55/223, 55/240, 55/257, 55/435, 261/17, 261/23, 261/114, 261/116
[51] Int. Cl. ..........................................B01d 47/06
[58] Field of Search............55/220, 222, 223, 235–239, 55/240, 241, 257–260, 85, 90, 92, 93, 94, 435; 261/112–114, 17, 23, 116; 52/249

[56] References Cited

UNITED STATES PATENTS

| 255,043 | 3/1882 | Smith | 189/36.5 |
|---|---|---|---|
| 1,756,031 | 4/1930 | Leach | 110/1 A |
| 1,878,467 | 9/1932 | Clarke | 261/79.1 |
| 2,226,127 | 12/1940 | Harmon | 55/230 |
| 2,234,385 | 3/1941 | Ryner | 261/113 |
| 2,896,928 | 7/1959 | Osborne | 261/113 |
| 3,064,408 | 11/1962 | Erga et al. | 55/90 |
| 3,250,061 | 5/1966 | Brotzmann | 55/189 |
| 3,317,197 | 5/1967 | Lohner et al. | 261/DIG. 54 |
| 3,363,889 | 1/1968 | Shirley et al. | 110/1 A |
| 3,540,855 | 11/1970 | Moore et al. | 261/112 |

Primary Examiner—Bernard Nozick
Attorney—Stefan M. Stein

[57] ABSTRACT

A wet scrubber system is disclosed wherein the outer metal tank of the scrubber is protected from pitting and corrosion by providing an air gap between the tank and the acid resistant inner liner. A washing solution is cascaded in the space between the tank and liner along with a counter flow of oxygen containing gas to both wash and passify the metal surface.

15 Claims, 5 Drawing Figures

Hoyt B. McLendon
INVENTOR.

BY Stefan M. Stein
ATTORNEY

WET SCRUBBER TANK

This invention deals generally with wet scrubbing systems wherein gas carried particulates are removed from incinerator effluents and in particular to the construction of wet scrubber tanks.

Incineration is a controlled combustion process for turning solid, liquid or gaseous combustible waste to gases and residues containing little or no combustible material. Most large scale municipal incineration today takes place in specially designed furnaces. There are three basic types of incinerator furnaces commonly used today. They are generally termed vertical-circular, rectangular and rotary kiln furnaces. Although these furnaces vary in design configuration, they all perform the function of incineration equally well.

Time, temperature and turbulence are commonly called the three "T's" of combustion. When solid waste is exposed for a sufficient time to a turbulent, hot atmosphere, waste products will be satisfactorily incinerated. In order for a substance to burn, the moisture contained in a material must be eliminated. During vaporization of the moisture, the temperature of the material will stay below 212° Farenheit. Once the moisture is removed, the temperature of the substance will be raised to its ignition point.

The combustion process and incineration is generally thought of as occurring in two overlapping stages, primary combustion and secondary combustion. Primary combustion generally refers to the physical-chemical changes occurring in proximity to the fuel bed and consists of drying and ignition of the solid waste. Secondary combustion refers to the oxidation of gases and particulate matter released by primary combustion. To promote secondary combustion, a sufficiently high temperature must be maintained. In addition, turbulent air must be mixed with the gas stream.

The burning of solid waste generates heat that expands the volume of gas, therefore, gas passages, air pollution control devices and the exhaust stack must be built to accomodate this gas. In order to adequately complete this combustion process, there must be an adequate draft from the combustion area. In the past, incinerator stacks have provided a natural draft and dispersion for gases and the entrained particulate matter from incineration. Therefore, the height and diameter of the stack would be predicated upon the amount of draft required, the topographic and climatic conditions. Today, many incinerators utilize induced draft fans to supplement the natural draft in moving gases through the incinerator. An induced draft fan is generally preferred over the natural draft stack because control over the burning rate of solid waste can be better maintained and air pollution collection devices better operated with the constant air volume and uniform pressure drop that the induced draft fan creates.

As stated above, adequate temperature, time and turbulence is necessary to completely burn the gases and carbon suspended in the gases of furnace effluent. If temperatures are too low, the oxidation reactions are incomplete; if too high, the temperatures can cause equipment and structural damage throughout the incinerator. Within the furnace, the temperature immediately above the burning waste generally ranges from 2,100° to 2,500° Farenheit and in localized areas it may be higher. When the gas leaves the combustion chamber, it mixes with the excess air and the temperature generally drops somewhere between 1,400° and 1,800° Farenheit. Where induced draft fans, wet scrubbers, electrostatic precipitators and other devices are used, the gases have to be cooled further.

Regulation of the flue gas temperature is achieved principally through the use of excess air, water evaporation and heat exchange. Of these, the addition of outside air to the flue gas is most common. In the second method water is injected into the hot gas stream and cools the flue gas through evaporation of the water and absorption of heat during super heating of the water vapor. The advantage of the heat exchange method for cooling the flue gas is that additional substances are not added to the gas flow, therefore gas volume is not increased and the size of collection devices, fans and passages can be reduced.

In the past few years there has been much concern over the pollution of the atmosphere. One of the major sources of pollution has been the venting of gaseous industrial waste directly into the atmosphere. An analysis of the chemical pollutants in a municipal incinerator effluent gas discloses two general catagories: gases; organic and inorganic, and particulate matter; organic and inorganic, which is entrained by the flue gas. The inorganic gases consist primarily of oxides of sulfur, oxides of nitrogen and ammonia. The inorganic particulates consist primarily of the oxides of such metals as aluminum, silicone, potassium, calcium, iron, titanium, zinc, sodium and magnesium. Formation of complex oxides of aluminum and silicone are also possible. The organic gases and particulate matter consist primarily of fatty acids, esters, aldehydes, hydrocarbons, and oxides of carbon. Most are present as gases although the fatty acids may also be present as particulates.

It has been found that the particulate matter is generally of a combustible nature and that for a given refuse composition, the quantity of particulates appears to; increase with increased grate action, and under fire air flow and to decrease with improved combustion. The distribution of particle size also appears to vary with the efficiency of the furnace and the character of the refuse. Furnaces operated in excess of designed capacity show a larger weight of particulate matter per pound of flue gas as opposed to a furnace operated at less than rated capacity.

Corrosion and toxic problems can result from the presence of some types of constituent gases and particles if found in significant amounts. In inorganic gases, sulfur oxides, ammonia and nitrogen dioxide could all be potential toxic hazards because of their high index of toxicity. Also, the presence of hydrogen fluoride and hydrogen chloride in the flue gas present both a corrosive and toxic hazard in that even minute quantities of these gases may be highly corrosive to the pollutant collector unit. It has also been found that inorganic particulates such as $Na_2O$, $K_2O$, $Fe_2O_3$, and $ZnO$ are highly corrosive either because of their strong basic or acidic characteristics. Also, substances such as $SiO_2$, $Na_2O$, $K_2O$ and $NO$ represent potential health hazards because of their high toxic level if generated in sufficient quantities, without adequate dispersion.

In addition to the inorganic substances, organic substances have been studied, and it appears that organic acid, aldehydes, and esters do not present any corrosion problem. Also, the oxides of carbon do not normally present toxic and corrosive hazards except that corrosive conditions can develop if appreciable amounts of carbon dioxide are absorbed in water. It should be noted that certain substances that are typically incinerated in municipal incinerators, such as pressurized cans and polyurethane type plastics, could constitute toxic and corrosive problems due to the liberation of halogenated hydrocarbons and phosgene or toluene diisocyanate gases.

In addition to reducing flue gas pollutants by more efficient combustion of the effluent, air pollution control equipment has been developed. Generally, the particular type of control system used by an incinerator unit, will depend upon the desired level of control, taking into account both quantitative and optical emission criteria, and the overall cost to own and operate the system.

Settling chambers are the oldest and simplest form of particulate collector. In operation of a settling chamber, the velocity of the flue gas is reduced by the use of baffle plates and the like. As flue gas velocity diminishes, smaller and smaller diameter particles will settle out. The advantages of this type of equipment is that it is a simple method of fly ash control with low maintenance cost and is capable of being operated with a natural-draft chimney. The disadvantage of this system is its large size; its high installation cost and its low collection efficiency of between 40 and 60 percent and its unsuitability for collection of entrained particles smaller than 30 microns.

A second type of particle collector is known as a mechanical cyclone. Here, entrained particles are thrown to the periphery of the cyclone, by centrifugal force, and are allowed to settle out. The advantages of the mechanical cyclone are the low initial cost and the low operating cost. The disadvantages, however, are low efficiency, especially as to smaller particles; erosion of the tube by abrasive fly ash; and moisture control problems.

In a third system, known as an electrostatic precipitator, the gas carried particles are first electrically charged and then passed by a plate which has an opposite charge. The particles lose their charge upon contact with the plate and migrate down toward collection hoppers. The efficiency of this system is dependent upon the relationship between the inertia of the particles and electrostatic attraction to the plates. The advantages of this type of electrostatic collector are: low operating cost; and efficiency ranging from 90 to 99 percent and highest efficiency for particles less than 10 microns in size; in addition to the ability to handle both dust and mist. The disadvantage is an extremely high purchase and installation cost, the necessity of the uniform gas distribution in order to obtain the design efficiency; a high criticality of the voltage range i.e., too little reduces efficiency and too much causes electric arcing. Further, an electrostatic precipitator loses effectiveness when the flue gas particles have high resistivity, such as carbon or organic molecules. In addition, because the resistivity of particles increases with the temperature there is a critical optimum temperature within which range the precipitator should be operated.

A fourth type of particle collector is known as a wet scrubber. Generally, there are two types of wet scrubbers, the low energy type and the high energy type. In the low energy scrubber, water is sprayed over the gas stream causing particles to impinge on the water droplets and thereby be removed from the gas phase. Some of the advantages of a low energy scrubber are low cost both initial and operating. The one major disadvantage is that if the water droplets are larger than 200 times the diameter of the particles, the particles will not be effectively removed from the effluent stream; a second disadvantage is that the efficiency for removal of water soluble gases is low because of the limited amount of contact of the gas stream with the scrubbing liquid.

In a high energy scrubber the water sprays are fine and distributed more evenly, and the gas stream path is more tortuous because of the insertion of baffles, the use of packing or similar devices. The advantages of a high energy scrubber are an efficiency of 95 percent or greater due to the increased interface between the effluent gas stream and the scrubbing water. Also, baffles increase the impingement area for removal of the particulates and the water soluble gases. This increase is due to a spreading of the scrubbing liquid and increasing the area in contact with the gas stream. Some of the disadvantages of the wet scrubber are a high maintenance cost when the baffles become plugged. Corrosion is also a big problem because of the acidic change in pH of the scrubbing water after removing gases and certain particulates from the flue gas. In addition to the above, these type of scrubbers also require a large flow of water which itself must be cleaned.

In the general type high energy scrubber a stainless steel or other acid resistant tank is lined with an acid proof material such as acid brick. On the interior of the tank is located a plurality of baffle plates or similar devices. The effluent gas stream from the incinerator is forced into the base of the tank. An induced draft fan is located at the top of the stack in order to draw the flue gas through the baffle plates. Descending from the top of the stack is a washing solution which flows across a number of these baffle plates which extend across the flue gas flow. It will be noted that, under these operating conditions, the walls are continuously wet by condensing moisture and fine spray passing through the baffles. This relatively thin liquid layer on all surfaces is in intimate contact with flue gas constituents. Thus, hydrogen chloride, hydrogen fluoride, sulfur dioxide, carbon dioxide, nitric oxide and organic acids are continuously absorbed. These very corrosive and acidic constituents lower the pH of the liquid film on the surfaces. Severe corrosion of any exposed metal surface is a considerable problem in incinerator scrubbing systems.

In the normal course of events, the acid brick liner of the stainless steel tank keeps the acidic solution from contact with the tank. However, when acid does seep through, the passive chromium oxide layer of the stainless steel is broken down and localized pitting and corrosion takes place. Because this corrosion is on the interior of the scrubber tank it is difficult to detect until the pitting has become severe. Also, after detection, it is an expensive and lengthy operation to shut the scrubber down and repair the damaged area.

Several solutions have been offered to solve this problem of corrosion in liquid scrubbers. The first and most obvious solution would be to provide completely corrosion-resistant construction material. Studies have shown that the most common metals and alloys are badly pitted under the acidic conditions present in the scrubbers. Even, the nominally corrosion-resistant alloys, such as austenitic stainless steel, are of limited usefulness in scrubber construction. Titanium has been found to be more resistant to pitting or cracking than most alloys. The disadvantages of titanium however, are that it should not be utilized in the stack because of the high temperature excursions encountered there and also titanium is not very resistant to mineral acids. Another metal, tantalum, is resistant to the acid solutions found within the scrubbers however, economics would preclude extensive use of this metal.

It has also been suggested that various types of coatings be used to prevent corrosive liquids from directly touching the metal wall of the scrubber tank. One of the disadvantages here is that the high temperature excursion within the scrubber tank would damage the coating. A second and more important consideration is that coating a stainless steel with something like a coal-tar epoxy is essentially the same as any form of painting. This is not recommended because the edge of the coating acts as a crevice for initiating an active-passive, galvanic cell. The formation of a line of corrosion beneath the leading edge of the coating will occur and this line will become even more active as the debris of corrosion restricts the availability of oxygen to repair the active surface of the stainless steel.

The above and other suggested solutions to protect the acid scrubber tank from localized pitting and corrosion have been found to be generally unsatisfactory.

It is therefore an object of this invention to provide a high energy wet scrubber in which the scrubber tank is protected from leaks in the acid brick lining.

Another object is to provide an apparatus for reducing, by wet scrubbing, with salt or fresh water, the effluent gas of combusted products.

Still another object is to provide a wet scrubber tank which is designed to keep corrosion and erosion to a minimum.

A further object is to provide a high energy wet scrubber in which solid, particulate matter, entrained in the effluent flue gas is removed by high velocity impingement on a series of apertured baffle plates.

A still further object is to provide a high energy wet scrubber in which the wall comprises an acid proof liner surrounded by an air gap and a metal support structure.

Another object is to provide a scrubber tank in which an air gap exists between the acid brick lining and the surrounding tank so as to allow self aeration and cleaning of the tank wall section.

Another object is to provide a tank outer wall which is adapted to operate at temperatures of 200° Farenheit but will withstand temperatures up to 2,300° Farenheit for a period of time without causing excessive damage.

Another object is to provide a wet scrubbing tank designed so as to enable detection and repair of a leak in the acid brick lining at a minimum cost.

Another object is to provide a wet scrubber tank in which a flow of water is caused to cascade in the gap between the acid brick and the supporting tank wall.

Another object is to provide a counter-flow of air within this gap.

Another object is to provide a space between the acid brick and the outer shell support so as to insulate the outer shell support from internal heat.

Another object is to provide a wet scrubber wall of a construction whereby chloride pitting of the tank will be greatly diminished.

Other objects of the invention will in part be obvious and will in part appear hereinafter.

The above and other objects not specifically enumerated are obtained by providing in a high energy wet scrubber a series of apertured baffle plates set within a support tank that is lined with an acid brick liner. Hot flue gas is charged into the base of the tank and drawn up through the baffles by an induced draft fan. A washing solution is caused to flow over the apertured baffles whereby the gas will be washed as it passes through the apertures. An air gap is provided between the acid brick lining and the support wall of the tank. An air flow is initiated within this annular gap in addition to a counter-flow water spray. The water washes away any acid which may have seeped through the acid brick lining from the interior of the scrubbing system. The induced air flow places oxygen in intimate contact with the chromium oxide surface and aids in making passive any of the stainless steel surface pitted because of the presence of the acid solution.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
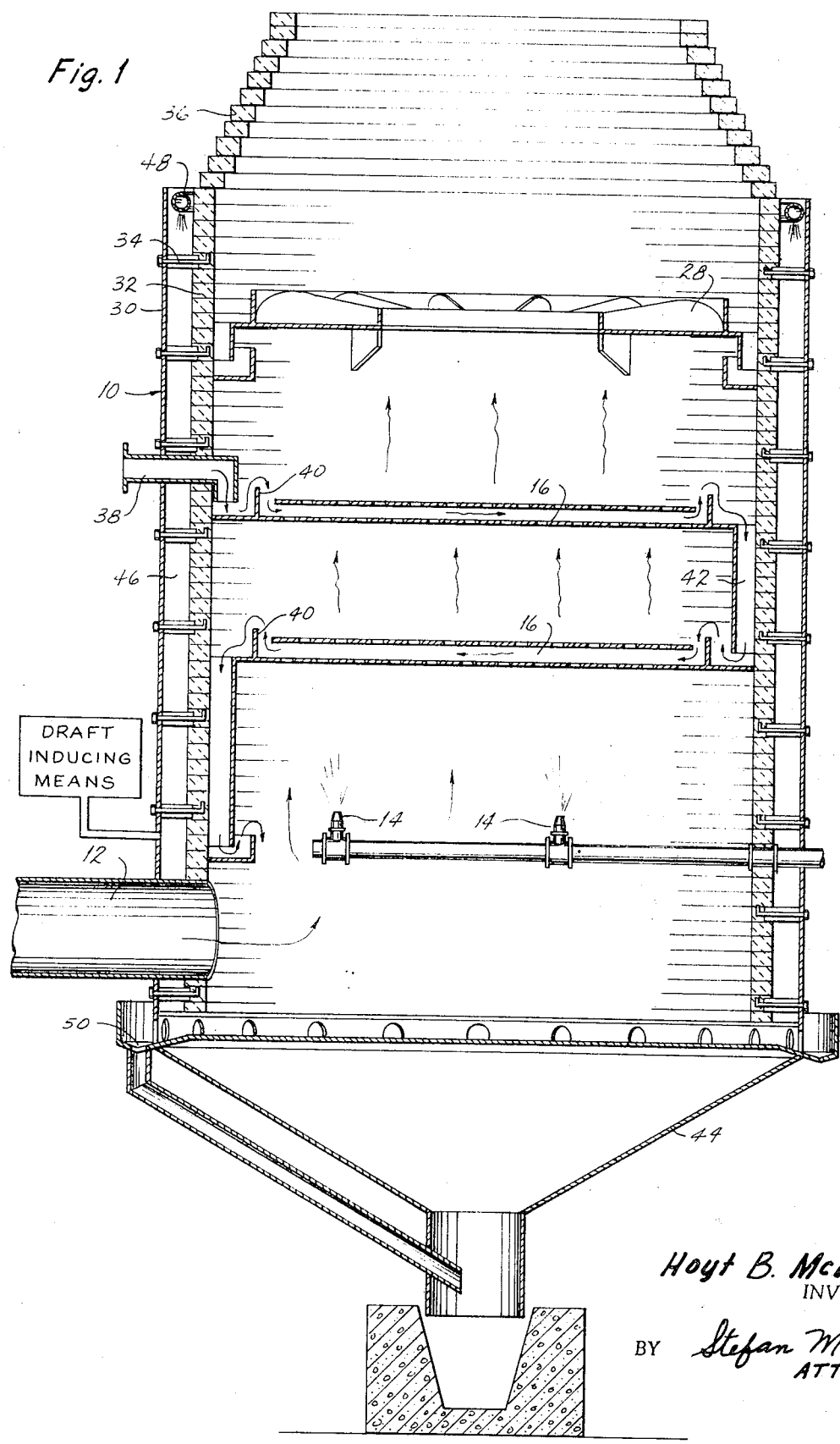
FIG. 1 is a cross-sectional view of a wet scrubber tank.

Referring now to FIG. 1, a wet scrubber 10 is shown which is designed to cause intimate gas-liquid contact for removing suspended particles, transferring heat and absorbing soluble materials.

Generally, the wet scrubber 10 consists of one or a number of impingement baffle stages 16, a humidifying spray 14 and a water eliminator 28. Scrubber 10 comprises an outer supporting tank wall 30 which may be constructed of stainless steel or other suitable materials. An acid brick liner 32 is provided in a spaced relation to tank wall 30 so as to provide an annular space between the tank 30 and liner 32. Bolts 34 or other suitable fasteners support liner 32 with respect to the tank. Stack 36 continues up from liner 32 and is operably connected to an induced draft fan (not shown).

A pipe 38 is provided in the wall of liner 32 and introduces the scrubbing liquid into the top of baffle stages 16. A weir 40 is also provided to provide a controlled depth liquid blanket across baffle stages 16. Against the interior of liner 32 a drain trough 42 is provided which transports the scrubbing liquid to the next baffle stage. The same structural arrangement may then again be repeated depending on the number of filter stages desired. After the lowest baffle stage, the scrubber liquid is discharged from scrubber base 44. The discharged scrubber liquid may be directly recirculated to the top stage or it may be cleansed and reused.

In operation, hot particle-laden flue gas from the incinerator (not shown) enters the base of scrubber 10 through conduit 12. The flue gas rises through humidifying sprays 14 issuing from washing means 15 where it is quenched, saturated and stripped of coarse particles. The spray 14 also washes the underside of the bottom baffle stage 16. The gas then flows through a baffle plate stage 16.

Many designs of baffle plate stages are utilized in wet scrubbers today.

Figure 2:
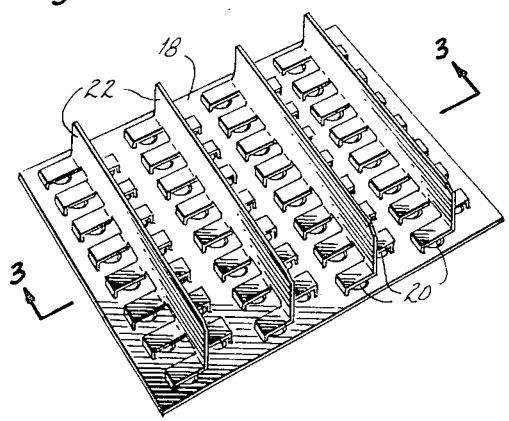
FIG. 2 is a perspective view of one design of baffle plate stage.

FIG. 2 illustrates one baffle design in which a plate 18 has a plurality of small apertures 20. It is not uncommon for plates, such as plate 18, to have apertures ranging from 600 to 3,000 apertures per square foot. Apertures 20 are surmounted by a baffle assembly 22 which places a baffle above each aperture.

Figure 3:
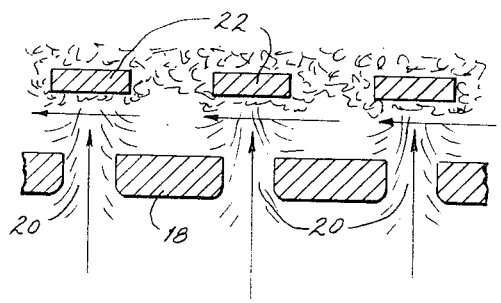
FIG. 3 is a view through line 3—3 of FIG. 2.
Figure 4:
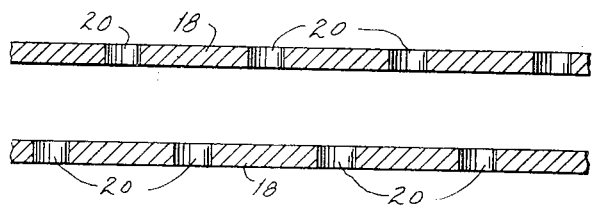
FIG. 4 is a sectional view of one design of a second baffle plate stage.

Baffle stages 16 are submerged in a blanket of scrubbing liquid such as water, as seen by FIG. 3, and the water flow is across the top of plate 18.

Figure 5:
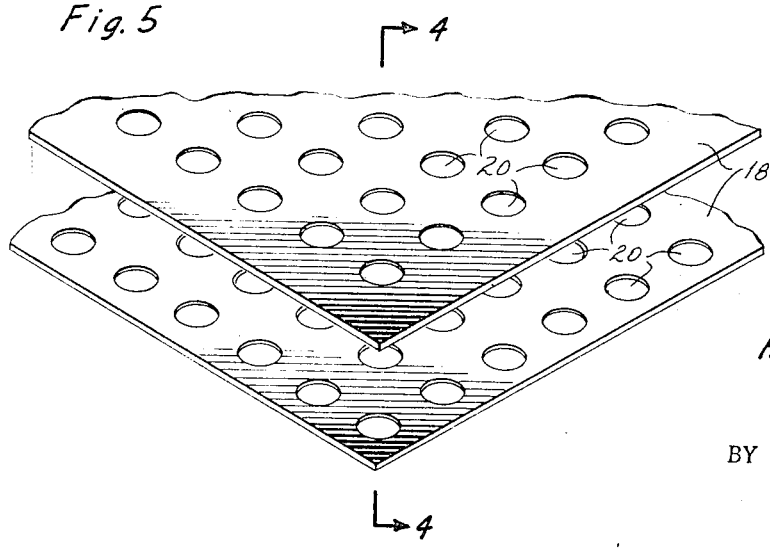
FIG. 5 is a view through perspective view of the baffle plate structure of FIG. 4.

FIG. 5 discloses another type baffle stage 24. The difference between the two stages is that instead of a separate baffle assembly 22 over each aperture 20 two adjacent plates 18 are misregistered and hence the space between the apertures acts as the baffle assembly for the plate beneath it.

The number of baffle stages which are used within the scrubber is a function of the level of intensive scrubbing desired.

The flue gas is drawn up from base 44 by the induction fan and drawn through the impingement plate 18 where the gas is divided into thousands of small jets. These jets, in overcoming the tendency of the water to flow downwardly, tear away droplets from the periphery of the holes. The liquid droplets from the blanket, flowing over plate 18, create a wetted surface on the underside of baffle 22, which is the point of maximum jet velocity. The directed impingement on a wetted surface dynamically precipitates particles and entraps them in the scrubbing liquid.

Each jet upon impingement, forms minute gas bubbles which rise through and create turbulence in the liquid blanket. The result is extremely close liquid-gas contact for maximum cleaning, high heat transfer and maximum absorption of solubles. Also, continuous violent agitation of the blanket by the bubbles prevents settling of entrapped particles and flushes them away in the scrubbing liquid.

While the gas is flowing upward the water lay is prevented from draining through the plate apertures by the aspirating effect of the flue gas.

As the flue gas passes from the last baffle stage, it goes through water eliminator 28, which comprises of a series of overlapping vanes (not shown). The eliminator removes many of the liquid droplets from the clean, saturated gas before it leaves the scrubber.

As illustrated by FIG. 1, baffle stages 16 as well as drain troughs 42 are removably attached to liner 32 in order to allow for periodic cleaning and replacement. As stated above, lining 32 is made of an acid brick or other ceramic material which will resist the corrosive effect of the highly acidic liquid by-product film that coats the interior of scrubber tank 10. A plurality of fasteners 34 fixedly attach and support liner 32 in a spaced relationship from tank 30. Fasteners 34 are constructed of cast iron and are ceramic coated so as to resist the corrosion by acid which may leak through liner 32. Tank 30 is preferably constructed of an acid resistant metal such as austenitic stainless steel or the like. The annular space between liner 32 and tank 30 is open at the top and bottom of scrubber 10. A flow of oxygen containing gas is induced by a fan or blower (not shown) to flow upward from the base of annular space 46. This flow will keep an adequate supply of oxygen in intimate contact with the chromium oxide layer of tank 30. The pressure of this oxygen supply will aid in reoxidizing any localized area of the chromium-iron alloy exposed by virtue of contact with any liquid acid seeping through liner 32.

At the top of annular space 46 is a toroidial pipe conduit 48 which is apertured and adapted to cascade a washing fluid, such as water, between liner 32 and wall 30. The fluid washes off any acid leaking through liner 32 into trough 50. This counter flow of passificating oxygen and washing liquid has been found to effectively prevent the acid pitting of tank 30. However, as is obvious from the above, it is within the contemplation of this invention that a scrubber tank be utilized with just a dead air space between the walls without using forced gas or liquid flow.

It is further within the contemplation of this invention that either the gas or the liquid flow be utilized alone in the cleansing operation.

It is further within the contemplation of this invention that the concept of separating the supporting tank from the protective liner be utilized in other industries where the capital investment of the tank unit dictates care in preventing the pitting and corrosion of the tank. Other industries where it is contemplated this invention would be utilized are: chemical, especially sulfuric, phosphoric and other acid manufacture; in foundries; paper mills; petro-chemical industries; fertilizer production; in clay, lime and soda ash production.

It will thus be seen that the objects set forth above, among those made apparent from the preceding description, are efficiently attained and, since certain changes may be made in the above article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A wet scrubber tank for removal of pollutant gases and particulate matter, said tank comprising: an outer peripheral wall, an acid resistant lining wall axially mounted within said tank, fastener means connecting said peripheral wall to said lining wall so as to maintain them in spaced apart relationship thereby defining a space therebetween, conduit means located at opposite ends of said tank lining wall whereby gaseous effluent may be respectively introduced into and carried out of said tank, cascading liquid means communicating with and mounted adjacent to said space such that liquid flows downwardly therein, draft inducing means arranged in communicating relation with said space such that a gas flow passes therethrough in cooperative contacting relation to the cascading liquid, and washing means serving to direct the spray onto the pollutant gases and particulate matter in the effluent.

2. A wet scrubber tank as in claim 1 wherein said cascading liquid means and said draft inducing means are mounted on said tank in spaced relation to one another and in communicating relation with said space, whereby said cascading liquid and said induced draft flow within said space in countercurrent relation to one another.

3. The wet scrubber of claim 1 wherein a gas containing oxygen is forced up the space between said tank and said lining while concurrently a liquid is forced down said space whereby an aeration and washing operation is simultaneously carried on.

4. The wet scrubber of claim 1 wherein said acid resistant lining is acid brick.

5. The wet scrubber of claim 1 wherein means are provided to force oxygen containing gas through said space between said tank and said lining.

6. The wet scrubber of claim 1 wherein said tank comprises stainless steel.

7. The wet scrubber of claim 1 wherein said lining and said tank are held in rigid spaced relationship by a plurality of bolts.

8. The wet scrubber of claim 7 wherein said bolts are coated with an acid resistant ceramic.

9. The wet scrubber of claim 1 wherein liquid cascading means are provided at the top of said annular space between said tank and said lining whereby said space is washed by said liquid.

10. The wet scrubber of claim 9 wherein said tank is round and further wherein said cascading means is a torodial, apertured pipe affixed to the top of said tank and adapted to cascade said liquid down said annular groove.

11. The wet scrubber of claim 9 wherein said liquid is water.

12. The wet scrubber of claim 1 wherein said tank has a plurality of apertured baffle plates.

13. A wet scrubber as in claim 12 comprising at least two apertured plates in fixed, parallel spaced relationship wherein said plate apertures are of one of said plates are misregistered with respect to said adjacent plate whereby the space between said apertures of one plate act as baffles for a substance flowing through an adjacent plate.

14. The impingement plates of claim 13 wherein said each of said plates have 600–3,000 apertures per square foot.

15. The impingement plate of claim 13 wherein said plates are made of corrosion and erosion resistant substances.

* * * * *